June 13, 1950 C. R. SUSKA 2,511,792
TEMPERATURE CONTROLLED MIXING VALVE-DIAPHRAGM TYPE
Filed Nov. 4, 1948 5 Sheets-Sheet 1
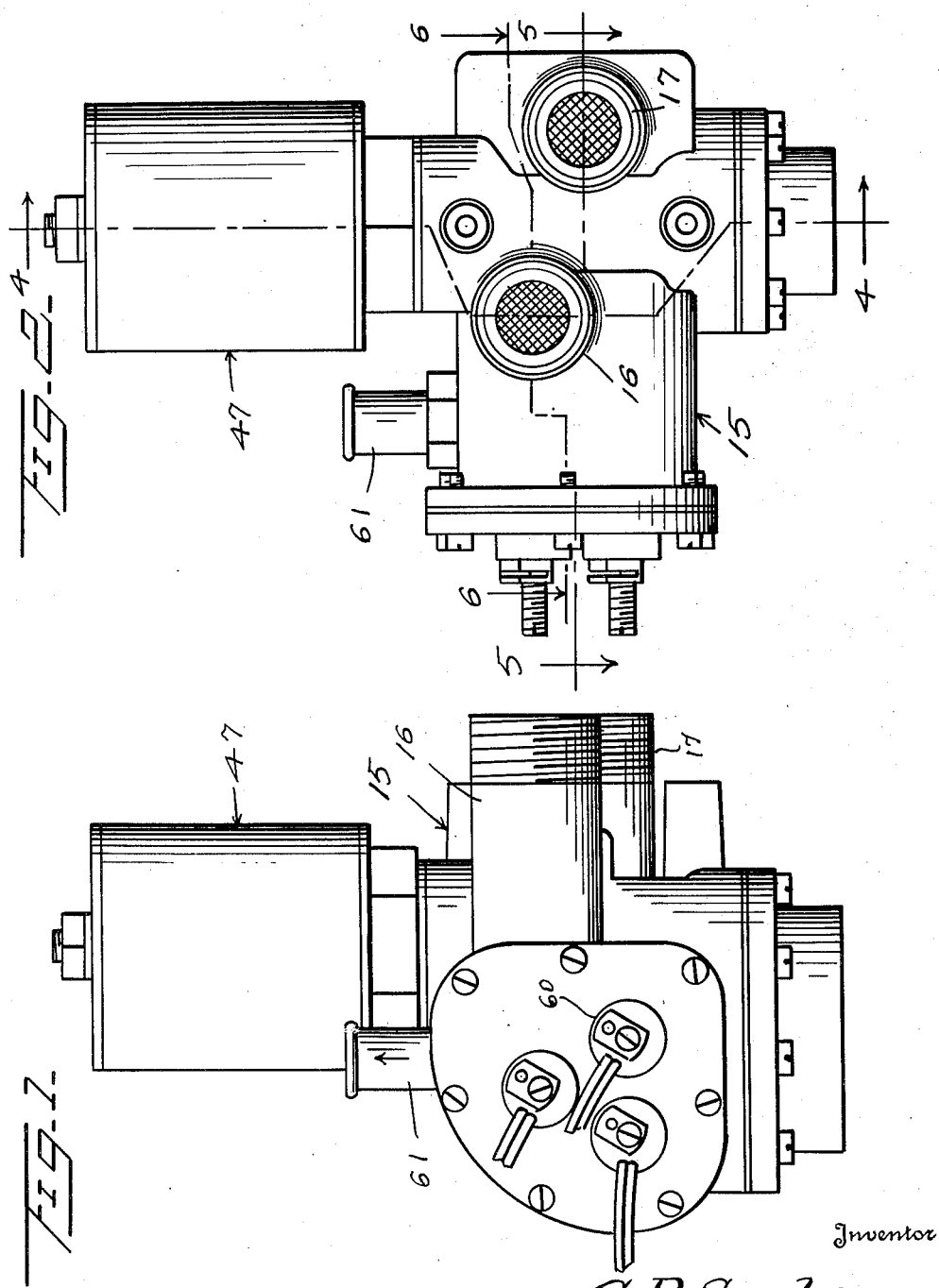
Inventor
C. R. Suska
By Kimmel & Crowell
Attys.

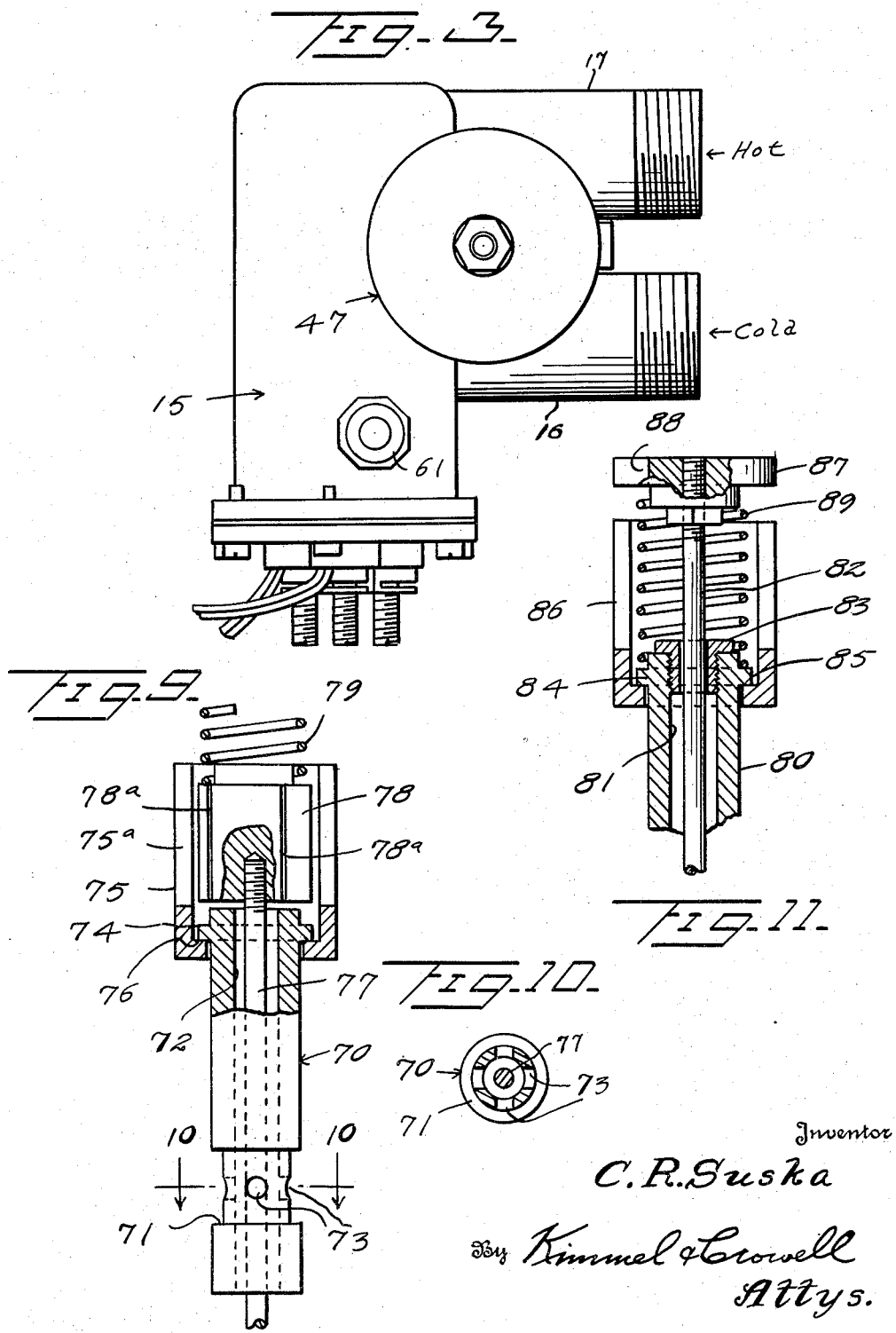

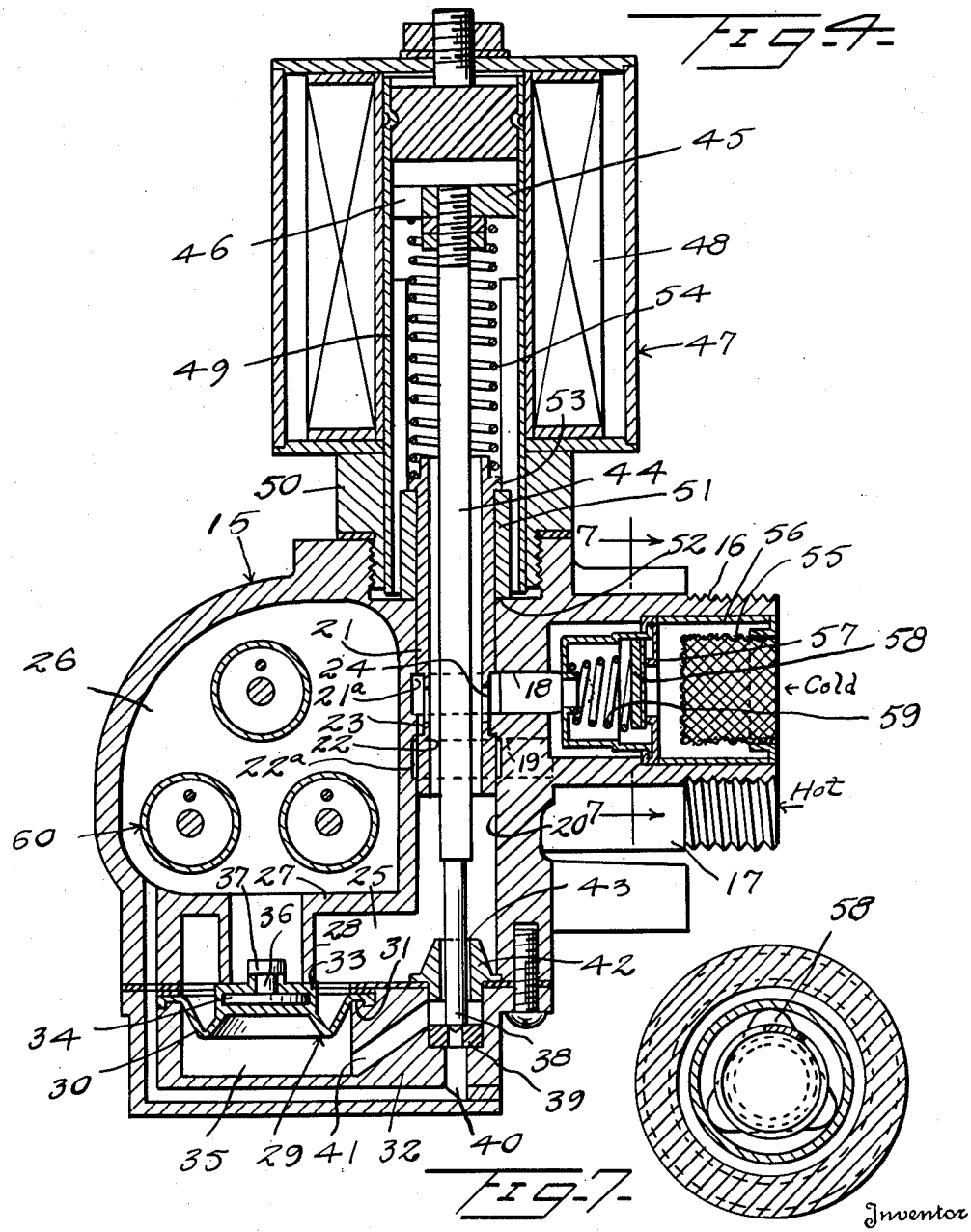

June 13, 1950 — C. R. SUSKA — 2,511,792
TEMPERATURE CONTROLLED MIXING VALVE-DIAPHRAGM TYPE
Filed Nov. 4, 1948 — 5 Sheets-Sheet 4
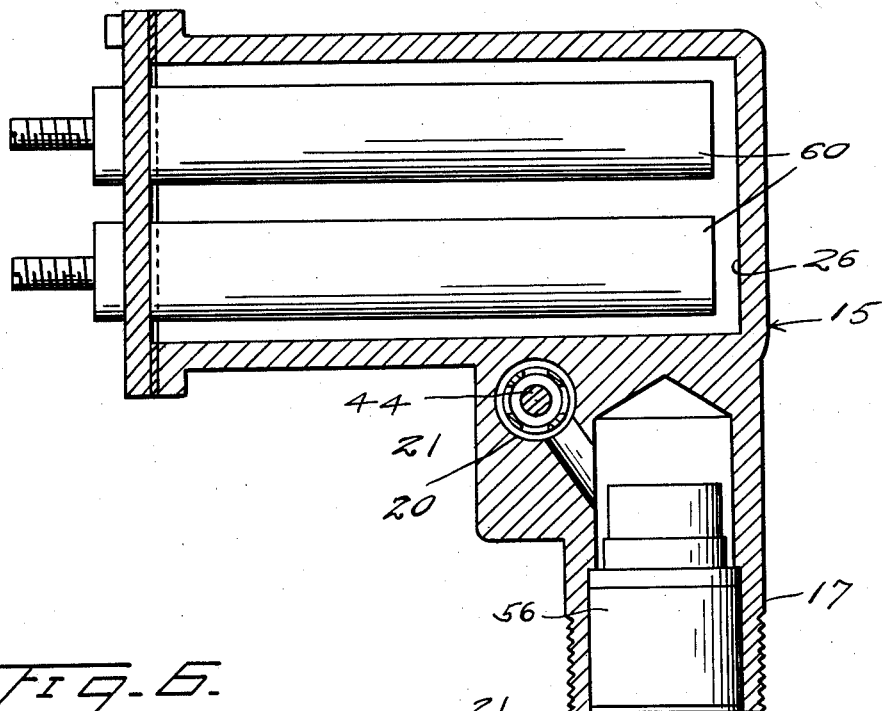
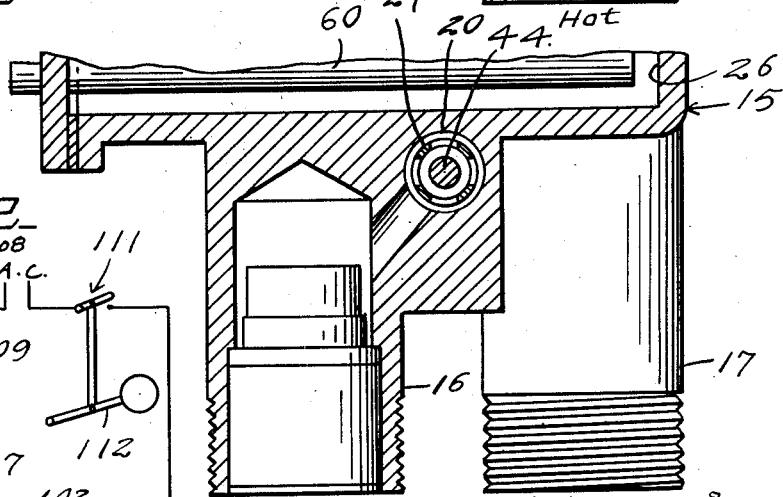
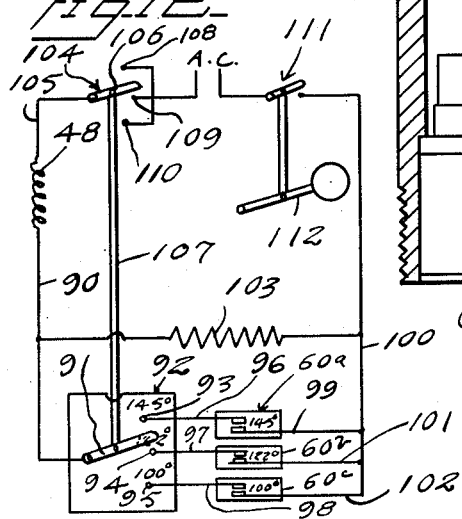
Inventor
C. R. Suska
By Kimmel & Crowell
Attys.

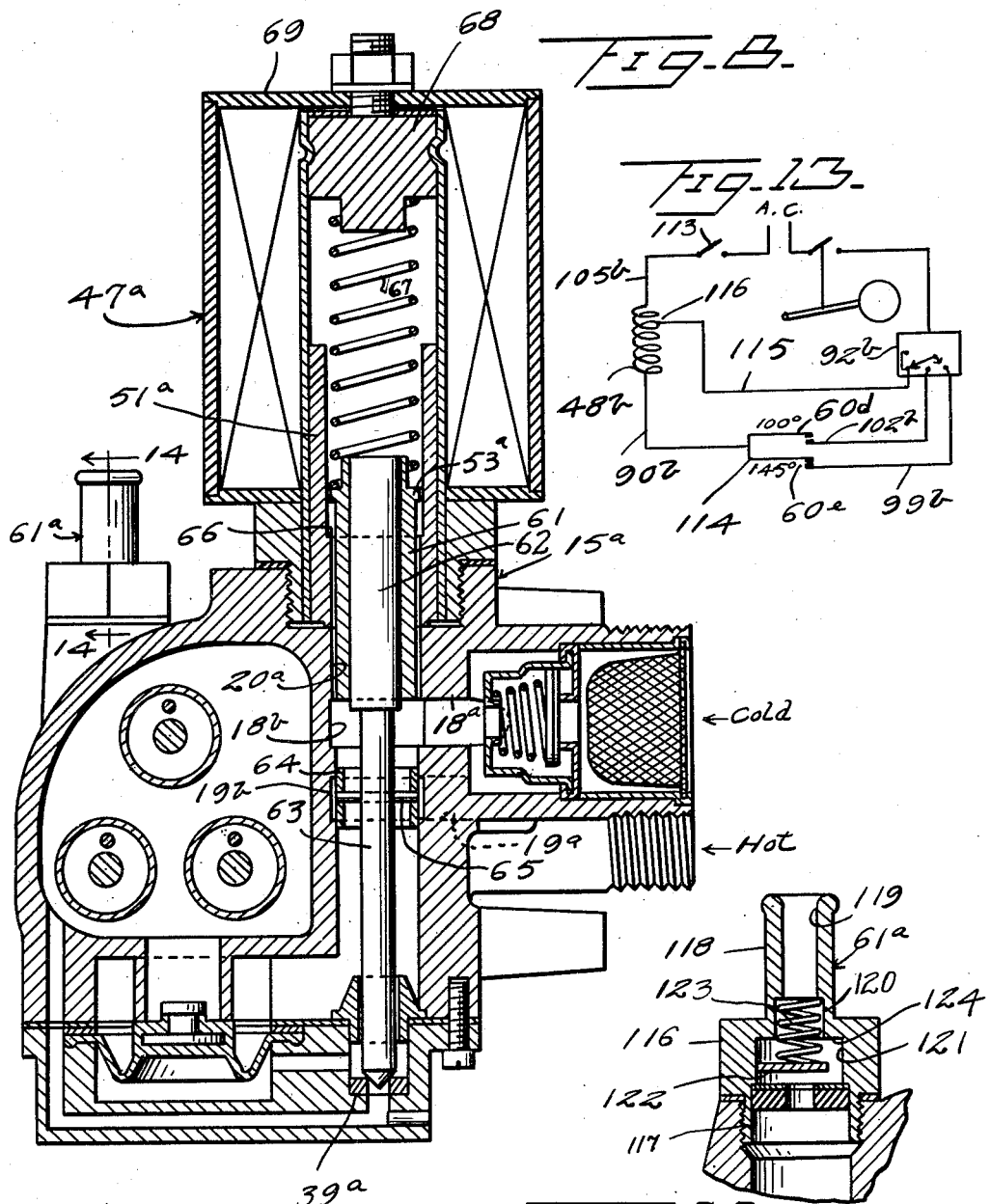

Patented June 13, 1950

2,511,792

UNITED STATES PATENT OFFICE 2,511,792

TEMPERATURE CONTROLLED MIXING VALVE-DIAPHRAGM TYPE

Charles R. Suska, Corry, Pa., assignor to Aero Supply Mfg. Co., Inc., Corry, Pa.

Application November 4, 1948, Serial No. 58,199

13 Claims. (Cl. 236—12)

This invention relates to a temperature controlled mixing valve of the diaphragm type.

An object of this invention is to provide a mixing valve wherein at least two fluids of different temperatures are adapted to be mixed together with the temperature of the mixed fluids controlled by means of thermostatic switches connected to the valve plug operator.

Another object of this invention is to provide a mixing valve including one or more quick acting thermostatic switches which are connected to a solenoid valve operator so that the temperature of the mixed fluids will be held to a predetermined minimum and maximum.

Another object of this invention is to provide in combination with a multi-pole time switch, a mixing valve, an electric operator for the valve, thermostatic switches connected to the time switch and the electric operator whereby a predetermined temperature of fluid passing through the valve will be maintained for a selected time period, and a float operated switch adapted to cut off current to the time switch and the thermostatic switches when a predetermined quantity of mixed fluids has been discharged into a receiver, such as a washing machine or the like.

Another object of this invention is to provide a modulated valve operation in a mixing valve so that tempered fluid may be discharged from the valve, the physical movement of the valve plug being effected by means of a solenoid connected to a series of thermostatic switches which are highly sensitive to temperature fluctuations.

A further object of this invention is to provide in a tempered mixing valve, a valve plug carried by a diaphragm wherein the diaphragm is held in closing position by pressure differential on opposite sides thereof, and is moved to open position by reduction of pressure on one side of the diaphragm.

A further object of this invention is to provide in a mixing valve of this type, means for balancing the valve plug when the latter is moved to open or mixing position.

A further object of this invention is to provide in a mixing valve of this type, means for balancing the valve plug in any position thereof.

With the above and other objects in view, my invention consists in the arrangement, combination and details of construction disclosed in the drawings and specification, and then more particularly pointed out in the appended claims.

In the drawings,

Figure 1 is a detail end elevation of a temperature controlled mixing valve constructed according to an embodiment of this invention, Figure 2 is a detail side elevation of the valve, Figure 3 is a plan view of the valve, Figure 4 is a sectional view taken substantially on the line 4—4 of Figure 2, Figure 5 is a sectional view taken on the line 5—5 of Figure 2, Figure 6 is a fragmentary sectional view taken on the line 6—6 of Figure 2, Figure 7 is a sectional view taken on the line 7—7 of Figure 4, Figure 8 is a vertical sectional view similar to Figure 4 of a modified form of this invention, Figure 9 is a fragmentary side elevation, partly in section, of another modification of this invention, Figure 10 is a sectional view taken on the line 10—10 of Figure 9, Figure 11 is a fragmentary vertical section of a further modification of this invention, Figure 12 is a diagrammatic view showing the electric circuits embodied in this invention, Figure 13 is a diagrammatic view of a modified form of electric circuit used with this invention, Figure 14 is a fragmentary sectional view taken on the line 14—14 of Figure 8.

Referring to the drawings and first to Figures 1 to 7 inclusive, the numeral 15 designates generally a valve housing which is formed with a pair of intake members 16 and 17 for connection to fluid supply means. The intake member 16 is designed for communicating the interior of the valve housing 15 with a source of cold fluid supply such as water or the like, whereas the intake member 17 is adapted to be connected to a heated fluid supply such as hot water.

The intake members 16 and 17 are constructed in the form of laterally projecting nipples, and the housing 15 is formed with intake ports 18 and 19 communicating with the intake members 16 and 17 respectively, and the intake ports 18 and 19 communicate with a vertically disposed bore 20 which is formed in the housing 15.

A vertically slidable valve plug 21 engages in the bore 20 and is preferably of hollow construction, being formed with a longitudinal bore 22. The plug 21 is formed with a peripheral groove 23 and is also formed with a plurality of openings 24 communicating the groove 23 with the bore 22. The housing 15 is formed with annular grooves 21a and 22a communicating with ports 18 and 19 respectively, so that the intake pressures will be evenly distributed entirely around plug 21.

The bore or guide 20 at its lower end communicates with a passage 25 which is disposed below a regulating chamber 26. The bottom wall 27 of the chamber 26 is formed with a depending valve seat 28 and a diaphragm valve generally designated as 29 is adapted to engage against the seat 28 so as to cut off flow of fluid from the passage 25 to the chamber 26.

The diaphragm valve member 29 includes a resilient disc-shaped member 30 which engages on a seat 31 formed in a lower head or plate 32. The resilient member 30 is formed at the central portion thereof with an enlarged head or valve member 33 within which a disc or weight member 34 is embedded.

The reinforcing member 34 also includes an upwardly projecting stud or stem 36 having a head 37 projecting above the top of the valve member 33 and extending into the interior of the valve or seat member 28.

A pilot valve member 38 is disposed below the lower end of the valve plug 21 and is adapted when in closed position to engage on a seat 39 carried by the head or plate 32. The head or plate 32 includes a passage 40 extending below the valve seat 39 and comprising a bypass passage which communicates with the regulating chamber 26. A pressure passage 41 is also formed in the head or plate 32, extending from a point above the valve seat 39 and communicating with the lower chamber 35.

A guide bushing 42 is carried by the head or plate 32 and the pilot valve member 38 loosely engages through the bushing 42. There is a substantial space 43 between the pilot valve member 38 and the bore of the bushing 42 so that pressure from the bore 20 will be communicated to the passage 41 and the chamber 35.

The pilot valve member 38 is carried by an elongated stem 44 which extends loosely and centrally through the valve plug 21, and the upper end of the stem 44 has secured thereto a disc-shaped guide or slide member 45 formed with at least one slot 46 extending inwardly from the periphery thereof. An electric operator generally designated as 47 is carried by the housing 15 and includes a solenoid coil 48 disposed about a tubular guide 49 which is fixed at its lower end in a nut 50 adapted to be threaded into the housing 15.

The disc or guide 45 for the pilot valve slidably engages within the tubular member 49. The solenoid 47 includes a movable core 51 which is of tubular construction and is adapted when in inoperative position to engage on a shoulder 52 which is formed in the housing 15. The core 51 engages the lower side of an annular rib or flange 53 which is carried by the upper end portion of the valve plug 21 so that upward movement of the core 51 will pull the valve plug 21 upwardly to mixing position.

A spring 54 is interposed between the rib or flange 53 and the head or plate 45 carried by the pilot valve stem 44 so that upon upward movement of the valve plug 21 the pilot valve 38 will, when the spring 54 has been tensioned to a predetermined degree, move the pilot valve member 38 to open position. The spring 54 also constitutes a balancing means which is adapted to provide a resilient force acting against the magnetic pull of the core 51 and maintaining the valve plug 21 in a predetermined mixing position and normally is spaced at its upper end from plate 45.

Each intake member 16 and 17 has disposed therein a screen or strainer 55 which is carried by the outer end portion of a spacer sleeve 56. A valve seat 57 is disposed at the inner end of sleeve 56 and a triangular check valve 58 is constantly urged by means of a spring 59 against seat 57. The check valve member 58 opens inwardly so that fluid will flow through an intake member when pilot valve 38 has been moved to open position and when main valve member 33 has also been moved to open position.

The regulating chamber 26 has disposed therein a plurality of thermostatic switch members 60, there being three such thermostatic members shown in Figure 4. The thermostatic switch members 60 are of conventional construction and are adapted to regulate the closing of the electric circuit to the solenoid coil 48 in accordance with the temperature of fluid passing through the chamber 26.

Referring now to Figure 8, there is disclosed a modified form of this invention, the modification of this invention being between the main valve plug and the pilot valve and the solenoid core. The valve housing 15a which is constructed similar to the valve housing 15, is formed with a bore 20a for the main valve plug 61 and valve plug 61 has fixed therein a pilot valve stem 62. The pilot valve stem 62 is formed with a reduced diameter lower portion 63 about which a sleeve valve member 64 is disposed. The sleeve valve member 64 is fixed to the lower stem member 63 by means of a pin 65 which extends through the lower stem member 63. The sleeve member 64 is spaced downwardly from the valve plug member 61 so that when the device is in inoperative position the sleeve member 64 will be disposed below the cold fluid intake port 18a and will be disposed in closed position with respect to the hot fluid intake port 19a. The housing 15a is formed with annular grooves 18b and 19b communicating with ports 18a and 19a respectively, so as to equalize the intake pressures around plug 61 and sleeve 64.

The housing 15a has extending upwardly therefrom an electric operator 47a which includes a tubular solenoid core 51a engaging about the valve plug 61. The valve plug 61 is formed with an annular rib 53a which is normally positioned above a shoulder 66 formed on the interior of the core 51a. In this manner there will be a lost motion between the core 51a and the plug 61 during the initial upward movement of the core 51a.

A spring 67 engages about the upper end of the plug 61 and the spring 67 at its upper end bears against a plug 68 which is fixed to the head 69 of the solenoid member 47a. Spring 67 is adapted to constantly urge valve plug 61 and pilot valve 62—63 downwardly, with the latter in closed position and engaging on a pilot valve seat 39a. In other respects the construction shown in Figure 8 is similar to that embodied in Figures 1 to 7 inclusive.

Referring now to Figure 9, there is disclosed a modified form of valve plug and pilot valve construction. A main valve plug 70 is formed with a peripheral groove or channel 71 and is also formed with a central bore 72. A plurality of openings 73 communicate the groove 71 with the bore 72. The upper end of the main valve plug 70 is formed with an annular rib 74 which is adapted to be engaged by the lower portion of a solenoid core 75 which is formed with a shoulder 76 bearing against the lower side of the rib 74. A pilot valve stem 77 is disposed loosely within the bore 72 and stem 77 has fixed to the upper end thereof an enlarged head 78 which loosely engages in the interior of the hollow core 75. Core 75 and head 78 are formed with slits 75a and 78a, respectively, to reduce or break up eddy currents. A spring 79 engages against the upper end of the head 78 and is adapted to engage against the upper end of the solenoid construction after the manner shown in Figure 8.

Referring now to Figure 11, there is disclosed a further modification of this invention wherein the main valve plug 80 which is formed with a longitudinal bore 81 has a pilot valve stem 82 loosely engaging through the bore 81. A bushing 83 is carried by the upper end of the plug 80 and provides a guide for the valve stem 82. The plug 80 is formed with an annular rib 84 which is adapted to engage against a shoulder 85 formed on the lower end of a solenoid core 86. The upper end of the pilot valve stem 82 has fixed thereto a plate or head 87 formed with a slot 88, and a spring 89 is interposed between the head or plate 87 and the upper end of the plug 80.

Referring now to Figure 12, there are disclosed the electric circuits associated with this invention. The solenoid coil 48 is connected at one end by means of a conductor 90 to the movable arm 91 of a time operated switch construction 92. The switch construction 92 is of conventional construction and includes contacts 93, 94 and 95. Contact 93 is connected by means of a conductor 96 to one of the thermostatic switch members 60a, whereas contact 94 is connected by means of a conductor 97 to a second thermostatic switch member 60b. Contact 95 is connected by means of a conductor 98 to the third thermostatic switch member 60c. Thermostatic switch member 60a is connected by means of a conductor 99 to a conductor 100 which is connected to one side of the electric current supply.

The conductor 100 is a common conductor for one side of each of the thermostatic switch members and switch member 60b is connected to conductor 100 by conductor 101, whereas switch member 60c is connected to conductor 100 by means of conductor 102.

A resistor 103 is connected between conductors 90 and 100 and provides a modulating means for supplying reduced current to solenoid 48 when any one of the thermostatic switch members has been moved to circuit breaking position, with time switch arm 91 engaging a predetermined one of the contacts 93, 94 or 95.

A switch 104 is interposed in the conductor 105 which is connected to the opposite side of the solenoid coil 48, and conductor 105 is connected to the opposite side of the current supply.

Switch member 104 includes a movable switch arm 106 which is operatively connected with switch arm 91 by means of a coupling or connecting member 107. Switch member 104 includes contacts 108, 109, and 110 which are connected to conductor 105 and are correlated with contacts 93, 94 and 95 respectively. In other words, when switch arm 91 is engaged with contact 93, switch arm 106 is engaged with contact 108. When switch arm 91 is moved to circuit breaking position switch arm 106 is also moved to circuit breaking position so that solenoid 48 will be disconnected from the supply source and will not be operative by the shunted or reduced current passing from conductor 100 through resistance 103, to conductor 90.

A float operated switch 111 is interposed in conductor 100 and is moved to circuit making or breaking position by means of a float 112 of conventional construction, which is adapted to be disposed in operative relation with respect to the receiver, such as the washing machine or the like, in order that the operation of the mixing valve structure may be regulated in accordance with the level of water or fluid within the receiver.

In the use and operation of this invention, and referring first to Figures 1 to 7, and to Figure 12, assuming that water of a temperature of 145° is desired in the receiver, switch arm 91 is moved to engagement with contact 93. Inasmuch as the temperature of the fluid in chamber 26 is initially less than 145°, thermostatic switch 60a will be in closed position, closing circuit from conductor 100 through thermostatic switch 60a, contact 93, and switch arm 91, to conductor 90. When switch arm 91 engages contact 93, circuit 105 is also closed in switch 104 by switch arm 106 engaging contact 108. At this time solenoid core 51 will be moved upwardly, moving therewith main valve plug 21 to a position where the lower end of plug 21 will uncover the hot fluid port 19.

Upward movement of plug 21 will compress spring 54 and will also move pilot valve 38 to open position with respect to valve seat 39. When pilot valve 38 is in open position, fluid pressure in chamber 35 will be released through bypass passages 41 and 40 to chamber 26, and the pressure in chamber 25 being greater than the pressure in chamber 35 will move valve member 33 to open position so that tempered fluid may flow from bore 20 through passage 25 and valve seat 28 into chamber 26. When the mixed fluid in chamber 26 has a temperature equal to or above 145°, thermostatic switch member 60a will move to circuit breaking position and in the event that the amount of fluid discharged into the receiver does not actuate float switch 111, and if the time period for the flowing of the hot fluid is under the predetermined time, solenoid 47 will be held in at least partially operative position by by-passing or shunting of electric current through resistance 103.

When solenoid 48 is energized by a reduced current passing through resistance 103, core 51 will be moved downwardly by spring 54 and main valve plug 21 will be lowered by spring 54 to a position at least partially covering the hot fluid port 19. At this time the pilot valve 38 will be disposed in open position so that main valve 33 will also be disposed in open position.

The valve structures shown in Figures 8 to 11 respectively will operate in substantially the same manner as that for Figures 1 to 7 inclusive.

In Figure 13 there is disclosed a modified form of electric circuit for the operator. The solenoid coil 48b is connected at one end by means of conductor 105b to one side of a supply source and a manual switch 113 is interposed in conductor 105b. The other end of coil 48b is connected by conductor 90b to a common conductor 114 connecting the thermostatic switches 60d and 60e together. Switch 60d is connected by conductor 102b to timer 92b and switch 60e is connected by conductor 99b to timer 92b. A shunt conductor 115 is connected between timer 92b and a tap 116 in coil 48b, so that enough energy will be fed to coil 48b when either 100° switch 60d or 145° switch 60e is connected with timer 92b for the purpose of holding valve plug 63 against closing.

In Figure 14 there is disclosed a pressure reducing outlet adapted for use with each of the valve structures herein disclosed. The outlet member 61a includes a boss 116 having a threaded bushing 117 and a nipple 118 formed with a bore 119 and a counterbore 120. The boss 116 is formed with a bore 121 within which a triangular valve 122 is loosely mounted. Valve 122 bears at its outer side against the inner end of spring 123 which is seated in counterbore 120. Bores 120 and 121 form a shoulder or seat 124 toward which valve member 122 is adapted to move under pressure of the discharging fluid. Where the fluid pressure is normal spring 123 will hold valve member 122 a substantial distance from seat 124, but if outlet pressure increases valve member will move toward seat 124 and will proportionately restrict the outlet port so that the rate of flow of the discharged fluid will always be within a predetermined range.

I do not mean to confine myself to the exact details of construction herein disclosed, but claim all variations falling within the purview of the appended claims.

What I claim is:

1. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means in said chamber connected with said operator for controlling operation of said operator in accordance with the temperature of fluid in said chamber.

2. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means in said chamber connected with said operator for controlling operation of said operator in accordance with the temperature of fluid in said chamber, said operative connection between said plug and pilot valve being so constructed and arranged as to provide a tensionable balancing force between said plug and said operator upon movement of said plug to fluid mixing position.

3. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, said valve member including a rigid disc member fixed thereto whereby to hold said valve member against distortion, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means in said chamber connected with said operator for controlling operation of said operator in accordance with the temperature of fluid in said chamber.

4. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, said valve member including a disc embedded in the central portion thereof whereby to reinforce the central portion of said valve member and hold the latter against distorting by pressure from either side thereof, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve, an operative connection between said pilot valve and said plug, said housing having a pressure communicating passage connecting said first named passage with the opposite side of said valve member, and thermostatic means in said chamber connected with said operator for controlling operation of said operator in accordance with the temperature of fluid in said chamber.

5. A temperature controlled mixing valve comprising a housing having a mixing chamber and a pair of intake ports, said housing having an intermediate passage communicating said intake ports with said chamber, a valve seat in said passage, a diaphragm valve member including a centrally disposed head engageable on said seat, a valve plug intersecting said intake ports and slidably carried by said housing, said plug being so formed and arranged that fluid pressure from one of said ports will be constantly disposed on at least a portion of one side of said valve member tending to thereby move said valve member to open position, an electric operator for said plug, said housing having a by-pass passage communicating said first named passage with said chamber, a pilot valve seat in said second passage, a pilot valve engageable on said latter seat, a spring interposed between said plug and said pilot valve, said spring being tensioned upon upward movement of said plug to mixing position, tensioning of said spring also effecting movement of said pilot valve to open position, there being a pressure communicating passage between said first named passage and the opposite side of said valve member, and thermostatic switch means in said chamber connected with said operator for controlling operation of said operator in accordance with the temperature of fluid in said chamber, movement of said pilot valve to closed position effecting a pressure differential on opposite sides of said valve member whereby said valve member will be moved to closed position by pressure thereon communicated to said valve member through said second passage.

6. A temperature controlled mixing valve comprising a housing having a mixing chamber and a pair of intake ports, inwardly opening check valves in each of said ports, said housing having an intermediate passage communicating said intake ports with said chamber, a valve seat in said passage, a diaphragm valve member including a centrally disposed head engageable on said seat, a valve plug intersecting said intake ports and slidably carried by said housing, said plug being so formed and arranged that fluid pressure from one of said ports will be constantly disposed on at least a portion of one side of said valve member tending to thereby move said valve member to open position, an electric operator for said plug, said housing having a by-pass passage communicating said first named passage with said chamber, a pilot valve seat in said second passage, a pilot valve engageable on said latter seat, a spring interposed between said plug and said pilot valve, said spring being tensioned upon upward movement of said plug to mixing position, tensioning of said spring also effecting movement of said pilot valve to open position, there being a pressure communicating passage between said first named passage and the opposite side of said valve member, and thermostatic switch means in said chamber connected with said operator for controlling operation of said operator in accordance with the temperature of fluid in said chamber, movement of said pilot valve to closed position effecting a pressure differential on opposite sides of said valve member whereby said valve member will be moved to closed position by pressure thereon communicated to said valve member through said second passage.

7. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve fixed relative to and extending below said plug, there being a pressure communicating passage between said first named passage and the opposite side of said valve member, and thermostatic means in said chamber connected with said operator for controlling operation of said operator in accordance with the temperature of fluid in said chamber.

8. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, a lost motion connection between said operator and said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means in said chamber connected with said operator for controlling operation of said operator in accordance with the temperature of fluid in said chamber.

9. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means connected with said operator for controlling operation of said operator in accordance with the temperature of fluid discharged from said housing.

10. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means connected with said operator for controlling operation of said operator in accordance with the temperature of fluid discharged from said housing, said operative connection between said plug and pilot valve being so constructed and arranged as to provide a tensionable balancing force between said plug and said operator upon movement of said plug to fluid mixing position.

11. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, said valve member including a rigid disc member fixed thereto whereby to hold said valve member against distortion, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means connected with said operator for controlling operation of said operator in accordance with the temperature of fluid discharged from said housing.

12. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, a lost motion connection between said operator and said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, thermostatic means in said chamber connected with said operator for controlling operation of said operator in accordance with the temperature of fluid in said chamber, an outlet member connected with said chamber, and a spring-pressed flow regulating member in said outlet member.

13. A temperature controlled mixing valve comprising a housing having a mixing chamber and a pair of intake ports, said housing having an intermediate passage communicating said intake ports with said chamber, a valve seat in said passage, a resilient pressure operated valve member engageable on said seat, a valve plug intersecting said intake ports and slidably carried by said housing, said plug being so formed and arranged that fluid pressure from one of said ports will be constantly disposed on at least a portion of one side of said valve member tending to move said valve member to open position, an electric operator for said plug, said plug and operator being so correlated as to provide a dashpot to cushion and retard the movement of said plug, said housing having a by-pass passage communicating said first named passage with said chamber, a pilot valve seat in said second passage, a pilot valve, an operative connection between said pilot valve and said plug, there being a pressure communicating passage between said first named passage and the opposite side of said valve member, and thermostatic means connected with said operator for controlling operation of said operator in accordance with the temperature of fluid discharged from said housing.

CHARLES R. SUSKA.

REFERENCES CITED

The following references are of record in the file of this patent:

UNITED STATES PATENTS

| Number | Name | Date |
|---|---|---|
| 1,103,756 | Gebhardt | July 14, 1914 |
| 2,296,266 | Breckenridge | Sept. 22, 1942 |
| 2,389,134 | Brown | Nov. 20, 1945 |
| 2,444,677 | Rosenblum | July 6, 1948 |